(12) United States Patent
Kao et al.

(10) Patent No.: US 11,641,346 B2
(45) Date of Patent: May 2, 2023

(54) DATA ANONYMITY METHOD AND DATA ANONYMITY SYSTEM

(71) Applicant: INDUSTRIAL TECHNOLOGY RESEARCH INSTITUTE, Hsinchu (TW)

(72) Inventors: Ming-Chih Kao, Taipei (TW); Yu-Hsuan Pan, Taipei (TW); Pin-Hui Lu, Taichung (TW); Pei-Hsuan Lu, Hsinchu (TW); Pang-Chieh Wang, Taipei (TW); Kai-Cheng Liu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 494 days.

(21) Appl. No.: 16/730,442

(22) Filed: Dec. 30, 2019

(65) Prior Publication Data
US 2021/0203644 A1    Jul. 1, 2021

(51) Int. Cl.
*H04L 9/40* (2022.01)
*G06F 16/28* (2019.01)
*G06F 16/22* (2019.01)

(52) U.S. Cl.
CPC ...... *H04L 63/0428* (2013.01); *G06F 16/2246* (2019.01); *G06F 16/285* (2019.01)

(58) Field of Classification Search
CPC ... H04L 63/0428; G06F 16/285; G06F 16/35; G06F 16/2246
See application file for complete search history.

(56) References Cited

U.S. PATENT DOCUMENTS

| | | |
|---|---|---|
| 7,103,838 B1 | 9/2006 | Krishnamurthy et al. |
| 10,169,610 B2 | 1/2019 | Dubov et al. |

(Continued)

FOREIGN PATENT DOCUMENTS

| | | |
|---|---|---|
| CN | 108073824 A | 5/2018 |
| CN | 108111968 A | 6/2018 |

(Continued)

OTHER PUBLICATIONS

"Algorithm Implementation/Strings/Levenshtein distance", Wikibooks, Dec. 19, 2019, pp. 1-36.

(Continued)

*Primary Examiner* — Esther B. Henderson
(74) *Attorney, Agent, or Firm* — Birch, Stewart, Kolasch & Birch, LLP

(57) ABSTRACT

A data anonymity method and a data anonymity system are provided. The data anonymity method includes the following steps. A data set comprising a plurality of direct-identifiers, a plurality of quasi-identifiers and a plurality of event logs each of which includes an activity and a timestamp is obtained. A content of each of the direct-identifiers is replaced by a pseudonym. The quasi-identifiers are classified, via a group-by algorithm with k-anonymity, as a plurality of equivalence classes. The activities corresponding to each of the direct-identifiers are linked according to the timestamps to obtain a plurality of event sequences. A similarity hierarchy tree is obtained according to a plurality of edit distances among the event sequences. The event sequences are grouped according to the similarity hierarchy tree with k-anonymity to obtain at least one group. The event sequences which are in the group are generalized.

20 Claims, 12 Drawing Sheets

(56) References Cited

U.S. PATENT DOCUMENTS

| | | | | |
|---|---|---|---|---|
| 11,227,231 | B2* | 1/2022 | Wu | G06N 5/022 |
| 2010/0027780 | A1* | 2/2010 | Jung | G06Q 10/10 |
| | | | | 380/28 |
| 2014/0317756 | A1* | 10/2014 | Takahashi | G06F 21/6254 |
| | | | | 726/26 |
| 2019/0114447 | A1 | 4/2019 | Kuo et al. | |
| 2019/0147988 | A1 | 5/2019 | Sharifi Sedeh et al. | |
| 2020/0018607 | A1* | 1/2020 | Balu | G08G 1/065 |

FOREIGN PATENT DOCUMENTS

| | | |
|---|---|---|
| CN | 105260670 B | 7/2018 |
| TW | 201426578 A | 7/2014 |
| TW | 201714113 A | 4/2017 |
| TW | 201814511 A | 4/2018 |
| TW | 201911075 A | 3/2019 |
| TW | 201911076 A | 3/2019 |
| TW | 201917608 A | 5/2019 |

OTHER PUBLICATIONS

Fahrenkrog-Petersen et al., "PRETSA: Event Log Sanitization for Privacy-aware Process Discovery", 2019 International Conference on Process Mining (ICPM), pp. 1-8.

Sherkat et al., "Efficient Time-Stamped Event Sequence Anonymization", ACM Transactions on the Web, Dec. 2013, vol. 8, No. 1, Article 4, pp. 1-53.

sklearn.cluster.AffinityPropagation-scikit-learn 0.22 documentation, Dec. 19, 2019, pp. 1-5.

* cited by examiner

| DI | AT | QI | TT |
|---|---|---|---|
| David | ER Registration | 85.0 | 2014-10-22 11:15:41 |
| David | Leucocytes | 85.0 | 2014-10-22 11:27:00 |
| David | CRP | 85.0 | 2014-10-22 11:27:00 |
| David | LacticAcid | 85.0 | 2014-10-22 11:27:00 |
| David | ER Triage | 85.0 | 2014-10-22 11:33:37 |
| ⋮ | ⋮ | ⋮ | ⋮ |
| Kenny | CRP | 40.0 | 2014-12-16 07:00:00 |
| Kenny | Release A | 40.0 | 2014-12-16 17:00:00 |
| LuLu | ER Registration | 51.0 | 2014-12-03 10:50:28 |
| LuLu | ER Triage | 51.0 | 2014-12-03 10:54:19 |
| LuLu | ER Spsis Triage | 51.0 | 2014-12-03 10:54:39 |

FIG. 3

| DI | AT | QI | TT |
|---|---|---|---|
| A | ER Registration | 85.0 | 2014-10-22 11:15:41 |
| A | Leucocytes | 85.0 | 2014-10-22 11:27:00 |
| A | CRP | 85.0 | 2014-10-22 11:27:00 |
| A | LacticAcid | 85.0 | 2014-10-22 11:27:00 |
| A | ER Triage | 85.0 | 2014-10-22 11:33:37 |
| ⋮ | ⋮ | ⋮ | ⋮ |
| KNA | CRP | 40.0 | 2014-12-16 07:00:00 |
| KNA | Release A | 40.0 | 2014-12-16 17:00:00 |
| LNA | ER Registration | 51.0 | 2014-12-03 10:50:28 |
| LNA | ER Triage | 51.0 | 2014-12-03 10:54:19 |
| LNA | ER Spsis Triage | 51.0 | 2014-12-03 10:54:39 |

FIG. 4

| DI | QI | SQ |
|---|---|---|
| P | 20.0 | @ER Registration@ER Triage@ER Sepsis Triage |
| TH | 20.0 | @ER Registration@ER Triage@CRP@LacticAcid@Leuc... |
| UH | 20.0 | @ER Registration@ER Triage@ER Sepsis Triage |
| VH | 20.0 | @ ER Registration@ER Triage@ER Sepsis Triage@Le... |
| CDA | 20.0 | @ER Registration@ER Triage@ER Sepsis Triage |
| ⋮ | ⋮ | ⋮ |
| JLA | 90.0 | @ER Registration@ER Triage@ LacticAcid@CRP@Lact... |
| WLA | 90.0 | @ER Registration@ER Triage@ER Sepsis Triage@CR... |
| CMA | 90.0 | @ER Registration@ER Triage@ER Sepsis Triage@CR... |
| KMA | 90.0 | @ER Registration@ER Triage@ER Sepsis Triage@IV... |
| YMA | 90.0 | @ER Registration@ER Triage@ER Sepsis Triage@Le... |

FIG. 5

| EC | QI | SQ |
|---|---|---|
| | 20 | @ER Registration@ER Triage@CRP@LacticAcid@Leuc... |
| | 20 | @ER Registration@ER Triage@CRP@Leucocytes@ER S... |
| | 20 | @ER Registration@ER Triage@ER Sepsis Triage |
| | 20 | @ER Registration@ER Triage@ER Sepsis Triage@IV... |
| | 20 | @ER Registration@ER Triage@ER Sepsis Triage@Le... |
| | 20 | @ER Registration@ER Triage@ Leucocytes@CRP@Lact... |

G1

| DI | QI | SQ | Size |
|---|---|---|---|
| P | 20.0 | @ER Registration@ER Triage@CRP@LacticAcid@Leuc... | 1 |
| UH | 20.0 | @ER Registration@ER Triage@CRP@Leucocytes@ER S... | 1 |
| CDA | 20.0 | @ER Registration@ER Triage@ER Sepsis Triage | 5 |
| UEA | 20.0 | @ER Registration@ER Triage@ER Sepsis Triage@IV... | 1 |
| OJA | 20.0 | @ER Registration@ER Triage@ER Sepsis Triage@Le... | 2 |

| DI | QI | SQ |
|---|---|---|
| TH | 20.0 | @ER Registration@ER Triage@CRP@LacticAcid@Leuc... |
| VH | 20.0 | @ER Registration@ER Triage@CRP@Leucocytes@ER S... |
| BDA | 20.0 | @ER Registration@ER Triage@ER Sepsis Triage@IV... |
| FEA | 20.0 | @ER Registration@ER Triage@ Leucocytes@CRP@Lact... |
| IMA | 20.0 | @ER Registration@ER Triage@Leucocytes@ER S... |
| WMA | 20.0 | @ER Registration@ER Triage@ER Sepsis Triage@Le... |

FIG. 7

| DI | QI | SQ |
|---|---|---|
| P | 20.0 | @ER Registration@ER Triage@ER Sepsis Triage |
| UH | 20.0 | @ER Registration@ER Triage@ER Sepsis Triage |
| CDA | 20.0 | @ER Registration@ER Triage@ER Sepsis Triage |
| UEA | 20.0 | @ER Registration@ER Triage@ER Sepsis Triage |
| OJA | 20.0 | @ER Registration@ER Triage@ER Sepsis Triage |
| VH | 20.0 | @ER Registration@ER Triage@ER Sepsis Triage@Le... |
| IMA | 20.0 | @ER Registration@ER Triage@CRP@Leucocytes@ER S... |
| WMA | 20.0 | @ER Registration@ER Triage@ER Sepsis Triage@Le... |
| TH | 20.0 | @ER Registration@ER Triage@CRP@LacticAcid@Leuc... |
| BDA | 20.0 | @ER Registration@ER Triage@ER Sepsis Triage@IV... |
| FEA | 20.0 | @ER Registration@ER Triage@ Leucocytes@CRP@Lact... |

| DI | QI | SQ | level 1 |
|---|---|---|---|
| VH | 20.0 | @ER Registration@ER Triage@ER Sepsis Triage@Le... | f83 |
| IMA | 20.0 | @ER Registration@ER Triage@CRP@Leucocytes@ER S... | f83 |
| WMA | 20.0 | @ER Registration@ER Triage@ER Sepsis Triage@Le... | f83 |
| VH | 20.0 | @ER Registration@ER Triage@ER Sepsis Triage@Le... | f83 |
| IMA | 20.0 | @ER Registration@ER Triage@CRP@Leucocytes@ER S... | f83 |
| WMA | 20.0 | @ER Registration@ER Triage@ER Sepsis Triage@Le... | f83 |

G4

⇒

| DI | QI | SQ | level 1 |
|---|---|---|---|
| VH | 20.0 | @ER Registration@ER Triage@ER Sepsis Triage@Le... | f83 |
| WMA | 20.0 | @ER Registration@ER Triage@ER Sepsis Triage@Le... | f83 |
| VH | 20.0 | @ER Registration@ER Triage@ER Sepsis Triage@Le... | f83 |
| WMA | 20.0 | @ER Registration@ER Triage@ER Sepsis Triage@Le... | f83 |
| IMA | 20.0 | @ER Registration@ER Triage@CRP@Leucocytes@ER S... | f83 |
| IMA | 20.0 | @ER Registration@ER Triage@CRP@Leucocytes@ER S... | f83 |

⇒

| DI | QI | SQ | level 1 |
|---|---|---|---|
| VH | 20.0 | @ER Registration@ER Triage@ER Sepsis Triage@Le... | f83 |
| WMA | 20.0 | @ER Registration@ER Triage@ER Sepsis Triage@Le... | f83 |
| VH | 20.0 | @ER Registration@ER Triage@ER Sepsis Triage@Le... | f83 |
| WMA | 20.0 | @ER Registration@ER Triage@ER Sepsis Triage@Le... | f83 |
| IMA | 20.0 | @ER Registration@ER Triage@CRP@Leucocytes@ER S... | f83 |
| IMA | 20.0 | @ER Registration@ER Triage@CRP@Leucocytes@ER S... | f83 |

| DI | TTS |
|---|---|
| S1 | [3, 7, 10] |
| S2 | [2, 4, 9] |
| S3 | [1, 3, 11] |

| DI | TTS |
|---|---|
| S1 | [[1-4], [7-10]] |
| S2 | [[1-4], [7-10]] |
| S3 | [[1-4], [7-10]] |

DATA ANONYMITY METHOD AND DATA ANONYMITY SYSTEM

TECHNICAL FIELD

The disclosure relates in general to a data anonymity method and a data anonymity system.

BACKGROUND

A data set may have direct-identifiers, quasi-identifiers (i.e. indirect-identifiers) and event logs. k-anonymity algorithm is used for data anonymity. For the direct-identifiers, the k-anonymity algorithm includes the step of replacing the content of the direct-identifiers by pseudonym. For the quasi-identifiers, the k-anonymity algorithm includes the steps of classifying the contents of the quasi-identifiers as several equivalence classes; generalizing the equivalence classes until the amount of the content of each of the equivalence classes is larger than k. However, the event logs corresponding the same direct-identifiers could be linked as an event sequence. The variability of the event sequences is larger than the event logs. If the steps described above are implemented for the event sequences, much information will be lost.

SUMMARY

The disclosure is directed to a data anonymity method and a data anonymity system. A data set having quasi-identifiers and event logs could be anonymized without loss much information.

According to one embodiment, a data anonymity method is provided. The data anonymity method includes the following steps. A data set comprising a plurality of direct-identifiers, a plurality of quasi-identifiers and a plurality of event logs each of which includes an activity and a timestamp is obtained. A content of each of the direct-identifiers is replaced by a pseudonym. The quasi-identifiers are classifying, via a group-by algorithm with k-anonymity, as a plurality of equivalence classes each of which has a quantity larger than k. The activities corresponding to each of the direct-identifiers are linked according to the timestamps to obtain a plurality of event sequences. A similarity hierarchy tree is obtained according to a plurality of edit distances among the event sequences. The event sequences are grouped according to the similarity hierarchy tree with k-anonymity to obtain at least one group whose size is larger than or equal to k. The event sequences which are in the group are generalized.

According to another embodiment, a data anonymity system is provided. The data anonymity system includes an inputting unit, a pseudonym unit, a classifying unit, a linking unit, a tree creating unit, a grouping unit and a generalizing unit. The inputting unit is for obtaining a data set comprising a plurality of direct-identifiers, a plurality of quasi-identifiers and a plurality of event logs each of which includes an activity and a timestamp. The pseudonym unit is for replacing a content of each of the direct-identifiers by a pseudonym. The classifying unit is for classifying, via a group-by algorithm with k-anonymity, the quasi-identifiers as a plurality of equivalence classes each of which has a quantity larger than k. The linking unit is for linking the activities corresponding to each of the direct-identifiers according to the timestamps to obtain a plurality of event sequences. The tree creating unit is for obtaining a similarity hierarchy tree according to a plurality of edit distances among the event sequences. The grouping unit is for grouping the event sequences according to the similarity hierarchy tree with k-anonymity to obtain at least one group whose size is larger than or equal to k. The generalizing unit is for generalizing the event sequences which are in the group.

BRIEF DESCRIPTION OF THE DRAWINGS

FIG. 3 shows a data set according to one embodiment.

FIG. 4 shows the data set whose direct-identifiers are replaced.

FIG. 5 shows the data set whose quasi-identifier has been generalized and whose activities are linked.

FIGS. 7 to 9 illustrate the step S140 according to one embodiment.

FIG. 10 illustrates the step S150 according to one embodiment.

FIG. 11 shows a group whose size is 6.

Figure 1:
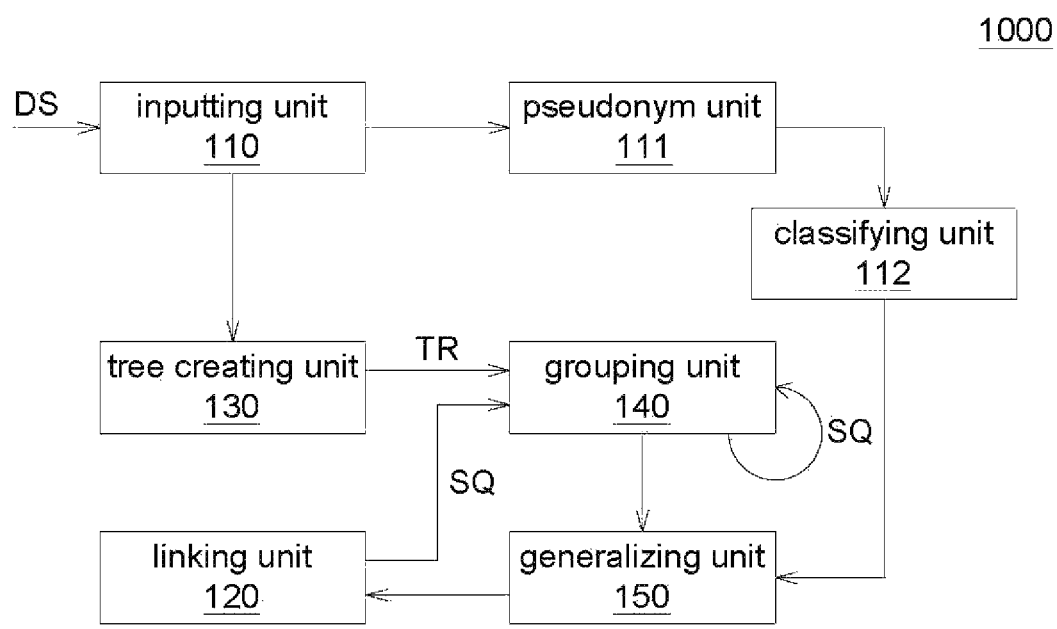
FIG. 1 shows a block diagram of a data anonymity system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a block diagram of a data anonymity system 1000 according to one embodiment. The data anonymity system 1000 includes an inputting unit 110, a pseudonym unit 111, a classifying unit 112, a linking unit 120, a tree creating unit 130, a grouping unit 140 and a generalizing unit 150. The inputting unit 110 is a wireless transmission module, a data transmission cable, a card reader, or a data bus. The pseudonym unit 111, the classifying unit 112, the linking unit 120, the tree creating unit 130, the grouping unit 140 and the generalizing unit 150 is a circuit, a chip, or a circuit board. In the data anonymity system 1000, a similarity hierarchy tree TR is created to assist the grouping of a plurality of event sequences SQ, such that the event sequences SQ could be generalized. The operation of those elements in the data anonymity system 1000 is illustrated via a flowchart as below.

Figure 2:
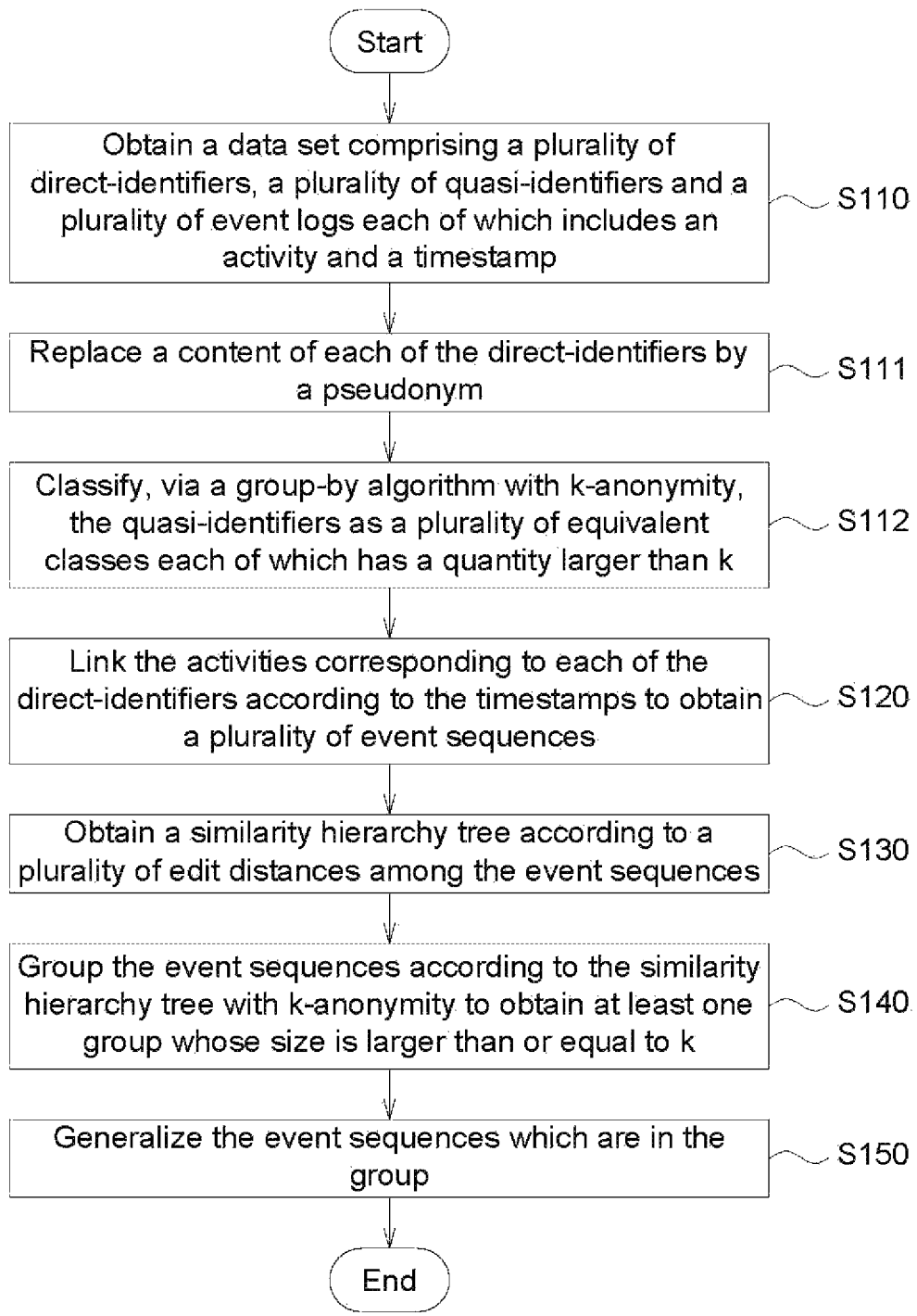
FIG. 2 shows a flowchart of a data anonymity method according to one embodiment.

Please refer to FIG. 2, which shows a flowchart of a data anonymity method according to one embodiment. In step S110, the inputting unit 110 obtains a data set DS comprising a plurality of direct-identifiers DI, a plurality of quasi-identifiers QI and a plurality of event logs EL. Please refer to FIG. 3, which shows the data set DS according to one embodiment. In the example pf FIG. 3, each of the event logs EL includes an activity AT and a timestamp TT. For example, the direct-identifier DI may be an identity card number or name; the activity AT may be the medical procedure; the quasi-identifier QI may be the age.

Next, please refer to FIG. 4, which shows the data set DS whose direct-identifiers DI are replaced. In step S111, the pseudonym unit 111 replaces the contents of the direct-identifiers DI by pseudonyms.

Afterwards, please refer to FIG. 5 which shows the data set whose quasi-identifier QI has been generalized and whose activities AT are linked. In step S112, the classifying unit 112 classifies, via a group-by algorithm with k-anonymity, the quasi-identifiers QI as a plurality of equivalence classes EC each of which has a quantity larger than k. For example, the quasi-identifiers QI may be the ages "1, 2, 3, . . . , 99." In each equivalence class EC, the content of the quasi-identifier QI is identical. The equivalence classes EC may be "age is 20", "age is 25", "age is 30", "age is 35", . . . and so on. The ages "1, 2, 3, 4, 5" could be combined into the age "5"; the ages "6, 7, 8, 9, 10" could be combined into the age "10"; the ages "11, 12, 13, 14, 15" could be combined into the age "15"; and so on. The ages "1, 2, 3, . . . , 99" are classified as "5, 10, 15, 20, 25, . . . , 90, 95."

Next, in step S120, the linking unit 120 links the activities AT corresponding to each of the direct-identifiers DI according to the timestamps TT to obtain a plurality of event sequences SQ. For example, the activities AT "ER Registration", "ER triage", "ER Sepsis Triage" have been linked via "@" to obtain one event sequence SQ "@ER Registration@ER triage@ER Sepsis Triage." In this step, the activities AT in each of the event sequences SQ are sorted over time. For example, "ER Registration", "ER triage", "ER Sepsis Triage" are recorded in chronological order, so the event sequence SQ records as "@ER Registration@ER triage@ER Sepsis Triage."

Figure 6:
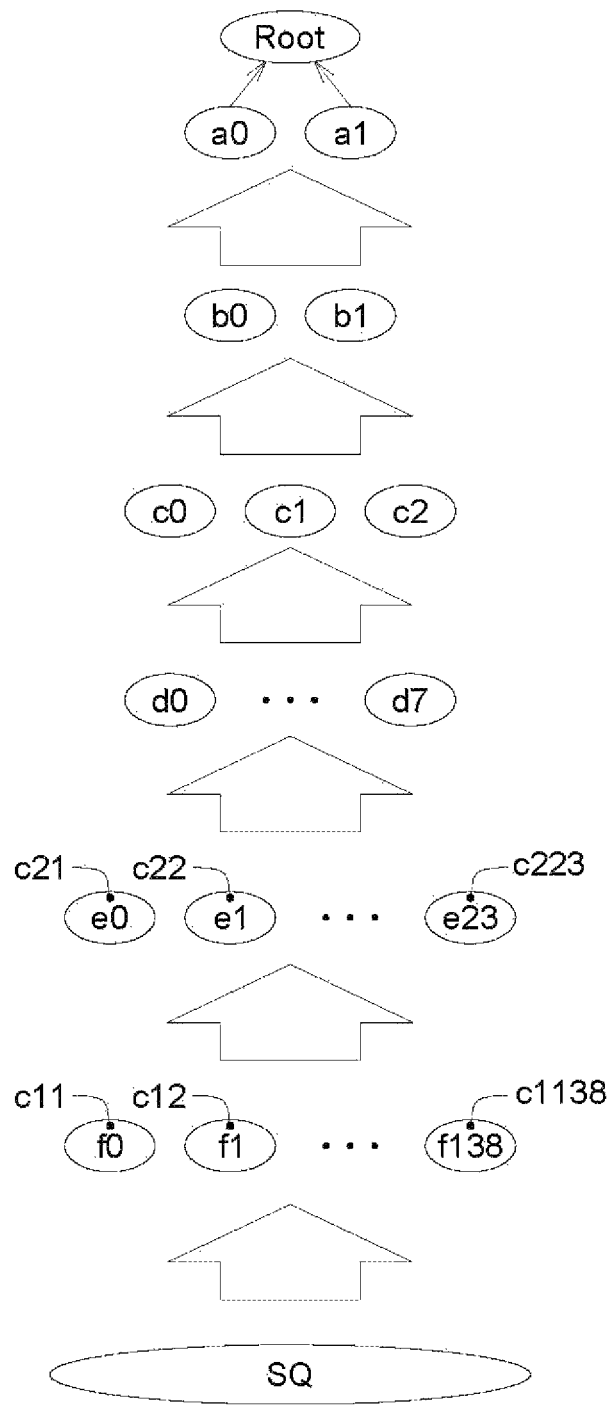
FIG. 6 shows a similarity hierarchy tree.

Then, please refer to FIG. 6, which shows a similarity hierarchy tree TR. In step S130, the tree creating unit 130 obtains the similarity hierarchy tree TR according to a plurality of edit distances among the event sequences SQ. The edit distance is a way of quantifying how dissimilar two strings (e.g., words) are to one another by counting the minimum number of operations required to transform one string into the other. If the edit distances among some of the event sequences SQ are less than a predetermined value, those event sequences SQ are classified as one cluster.

Referring to FIG. 6, all of the event sequences SQ are classified as a plurality of first level clusters f0, f1, . . . , f138. The amounts of the content of the first level clusters f0, f1, . . . , f138 are similar. The first level clusters f0, f1, . . . , f138 respectively have first centers c11, c12, . . . , c1138. The first centers c11, c12, . . . , c1138 are the medians of the first level clusters f0, f1, . . . , f138.

The first centers c11, c12, . . . , c1138 are classified as a plurality of second level clusters e0, e1, . . . , e23. The amounts of the content of the second level clusters e0, e1, . . . , e23 are similar. The second level clusters e0, e1, . . . , e23 respectively have second centers c21, c22, . . . , c223. The second centers c21, c22, . . . , c223 are the medians of the second level clusters e0, e1, . . . , e23.

The second centers c21, c22, . . . , c223 are classified as a plurality of third level clusters d0, . . . , d7. The amounts of the content of the third level clusters d0, . . . , d7 are similar. The following levels are analogized in this way.

Figure 8:
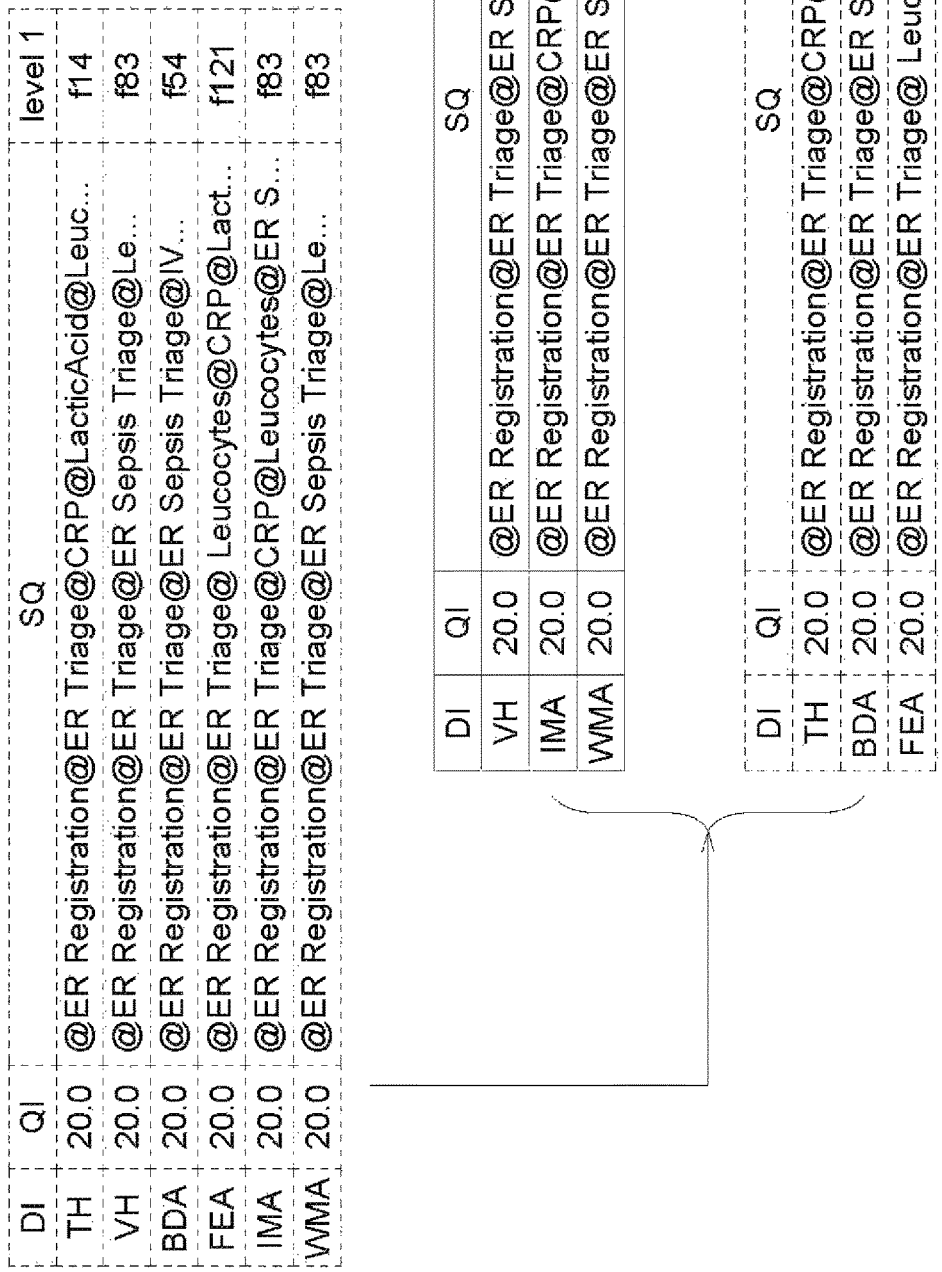
Figure 9:
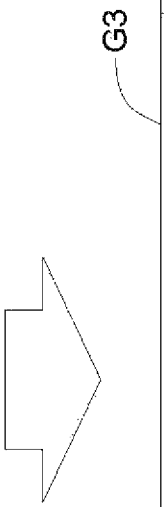

Then, please refer to FIGS. 7 to 9, which illustrate the step S140 according to one embodiment. In step S140, the grouping unit 140 groups the event sequences SQ according to the similarity hierarchy tree TR with k-anonymity to obtain at least one group whose size is larger than or equal to k. For example, k is 3.

As shown in the example of FIG. 7, for the equivalence class EC which is "age is 20", six kinds of event sequences SQ ("@ER Registration@ER Triage@CRP@LacticAcid@Leuc . . . ", "@ER Registration@ER Triage@CRP@Leucocytes@ER S . . . ", "@ER Registration@ER Triage@ER Sepsis Triage@", "@ER Registration@ER Triage@ER Sepsis Triage@ IV . . . ", "@ER Registration@ER Triage@ER Sepsis Trage@Le . . . ", "@ER Registration@ER Triage@Leucocytes@CRP@Lact . . . ") are shown. The grouping unit 140 groups the five identical event sequences SQ ("@ER Registration@ER Triage@ER Sepsis Triage@") whose quantity is maximum to obtain a group G1. The size of the group G1 is larger than k, i.e. 3. After grouping the five identical event sequences SQ ("@ER Registration@ER Triage@ER Sepsis Triage@"), six event sequences SQ ("@ER Registration@ER Triage@CRP@LacticAcid@Leuc . . . ", "@ER Registration@ER Triage@CRP@Leucocytes@ER S . . . ", "@ER Registration@ER Triage@ER Sepsis Triage@ IV . . . ", "@ER Registration@ER Triage@ER Sepsis Trage@Le . . . ", "@ER Registration@ER Triage@Leucocytes@CRP@Lact . . . ") are remained.

Referring to FIG. 8, for the equivalence class EC which is "age is 20", each of the six remained event sequences SQ is labeled as one of the first level clusters f0 to f138. For example, "@ER Registration@ER Triage@CRP@LacticAcid@Leuc . . . " is labeled as the first level cluster f14; "@ER Registration@ER Triage@ER Sepsis Triage@Le . . . " is labeled as the first level cluster f83; "@ER Registration@ER Triage@ER Sepsis Triage@ IV . . . " is labeled as the first level cluster f54; and so on. The grouping unit 140 groups the three event sequences SQ which are labeled as the first level cluster f83 to obtain a group G2 whose size is 3. The size of the group G2 is equal to k, i.e. 3. After grouping the three event sequences SQ according to the first level cluster f83, three event sequences SQ ("@ER Registration@ER Triage@CRP@LacticAcid@Leuc . . . ", "@ER Registration@ER Triage@ER Sepsis Triage@IV . . . ", "@ER Registration@ER Triage@Leucocytes@CRP@Lact . . . ") which are labeled as different first level clusters f14, f54, f121 are remained.

Referring to FIG. 9, each of the three remained event sequences SQ ("@ER Registration@ER Triage@CRP@LacticAcid@Leuc . . . ", "@ER Registration@ER Triage@ER Sepsis Triage@IV . . . ", "@ER Registration@ER Triage@Leucocytes@CRP@Lact . . . ") is labeled as one of the second level clusters e0 to e23. For example, "@ER Registration@ER Triage@CRP@LacticAcid@Leuc . . . " is labeled as the second level cluster e7; "@ER Registration@ER Triage@ER Sepsis Triage@IV . . . " is labeled as the second level cluster e7; "@ER Registration@ER Triage@Lecicytes@Lact . . . " is labeled as the second level cluster e16. Among the three remained event sequences SQ, the second level cluster e7 is the largest group and the size thereof is 2. The size of this group is not larger or equal to k, i.e. 3. So the three remained event sequences SQ could not be grouped according to the second level cluster e7.

Referring to FIG. 9, each of the three remained event sequences SQ is further labeled as one of the third level clusters d0 to d7. For example, "@ER Registration@ER Triage@CRP@LacticAcid@Leuc . . . " is labeled as the third level cluster d5; "@ER Registration@ER Triage@ER Sepsis Triage@IV . . . " is labeled as the third level cluster d5; "@ER Registration@ER Triage@Lecicytes@Lact . . . " is labeled as the third level cluster d5. The grouping unit 140 groups three the event sequences SQ which are labeled as the third level cluster d5 to obtain a group G3 whose size is 3. The size of the group G3 is equal to k, i.e. 3.

Referring to FIG. 10 which illustrates the step S150 according to one embodiment. As shown in FIGS. 9 and 10, the event sequences SQ are grouped in the group G1, the group G2 and the group G3. In the group G1, all of the event sequences SQ are identical, so the event sequences SQ in the group G1 are not needed to be generalized.

As shown in FIGS. 9 and 10, in step S150, the generalizing unit 150 generalizes the event sequences SQ which are in the group G2. In the group G2, the quantity of "@ER Registration@ER Triage@ER Sepsis Triage@Le . . ." is 2, and the quantity of "@ER Registration@ER Triage@CRP@Leucocytes@ER S . . ." is 1. "@ER Registration@ER Triage@ER Sepsis Triage@Le . . ." has largest quantity. Each of the event sequences SQ in the group G2 is replaced by a generalization sequence "@ER Registration@ER Triage@ER Sepsis Triage@Le . . ." whose quantity is largest.

As shown in FIGS. 9 and 10, in step S150, the generalizing unit 150 generalizes the event sequences SQ which are in the group G3. Each of the event sequences SQ in the group G3 is replaced by a generalization sequence "@ER Registration@ER Triage@CRP@LacticAcid@Leuc . . .".

Base on above, a data set DS having quasi-identifiers QI and event logs EL could be anonymized without loss much information.

If the size of the group is larger than (n−1)*k and less than or equal to n*k, the event sequences SQ in this group are replaced by n generalization sequences. For example, please refer to FIG. 11, which shows a group G4 whose size is 6. In FIG. 11, the size of the group G4 is 6 which is equal to 2*k, the event sequences SQ in the group G4 are replaced by 2 generalization sequences ("@ER Registration@ER Triage@ER Sepsis Triage@Le . . ." and "@ER Registration@ER Triage@CRP@Leucocyies@ER S . . .").

For another example, if the size of the group is 7 which is larger than (3−1)*k and less than 3*k, the event sequences SQ in this group will be replaced by 3 generalization sequences.

Figure 12:
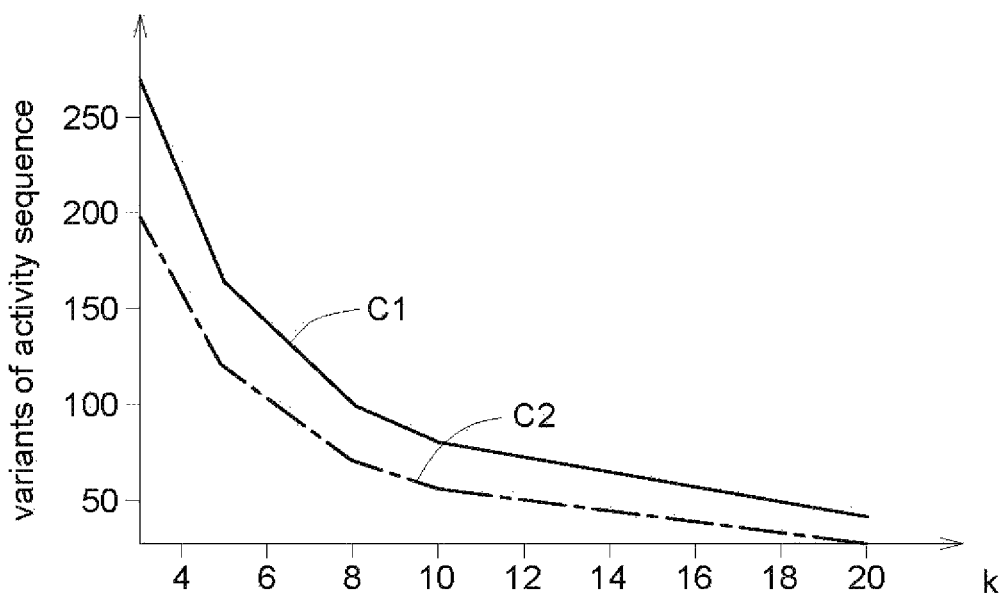
FIG. 12 illustrates the information loss of different data anonymity methods.

Please refer to FIG. 12, which illustrates the information loss of different data anonymity methods. Curve C1 illustrates the information loss of the present disclosed data anonymity method. Curve C2 illustrates the information loss of a conventional data anonymity method. As shown in FIG. 12, for any value of k, the variants of the event sequences SQ of the curve C1 is much higher than that of the curve C2. Thus, the information loss of the present disclosed data anonymity method is much less than that of the conventional data anonymity method.

Figure 13:
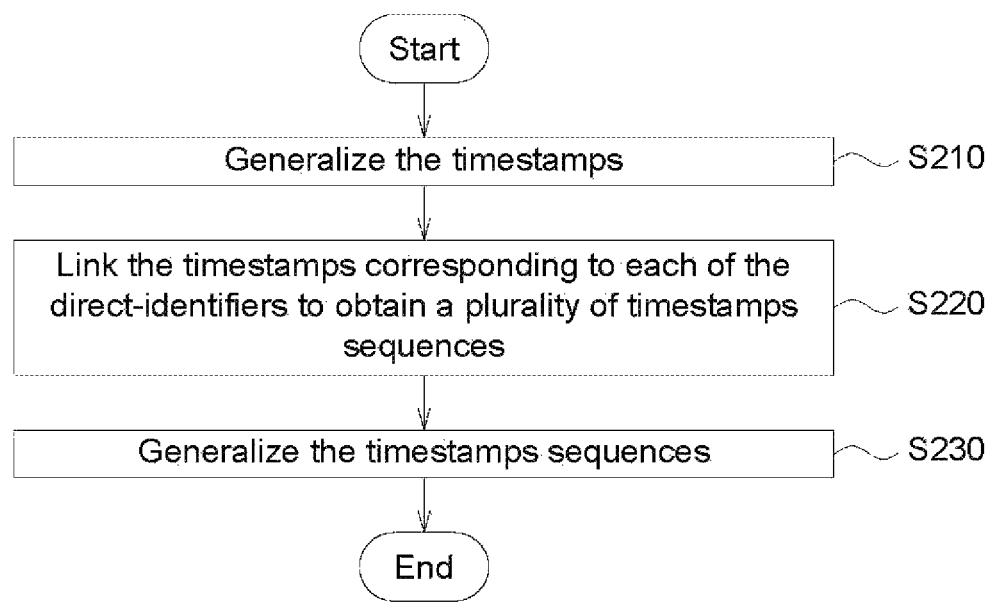
FIG. 13 shows a flow chart of a data anonymity method according another embodiment.
Figure 14:
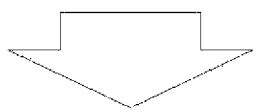
FIG. 14 illustrates the steps in FIG. 13.

Please refer to FIG. 13 and FIG. 14. FIG. 13 shows a flow chart of a data anonymity method according another embodiment, and FIG. 14 illustrates the steps in FIG. 13. In one embodiment, the timestamps may be anonymized without loss much information. In step S210, the generalizing unit 150 generalizes the timestamps. For example, "2019-3-26", "2019-7-28" and "2019-10-30" have been generalized as "3", "7" and "10" respectively.

Then, in step S220, the linking unit 120 link the timestamps corresponding to each of the direct-identifiers DI to obtain a plurality of timestamps sequences TTS, such as "[3, 7, 10]", "[2, 4, 9]", "[1, 3, 11]."

Next, in step S230, the generalizing unit 150 generalizes the timestamps sequences TTS. For example, "[3, 7, 10]", "[2, 4, 9]", and "[1, 3, 11]" are replaced by "[[1-4], [7-11]]." In this step, [1-4] overlaps with all of the timestamps sequences TTS and [7-11] overlaps with all of the timestamps sequences TTS. The "[[1-4], [7-11]]" has the lowest information loss. The information loss of [t1, t2] is calculated by the following equation (1):

$$(t2-t1)/(\text{maximum of the timestamp}-\text{minimum of the timestamp}) \quad (1)$$

Base on above, the timestamps could be anonymized without loss much information.

According to the embodiments disclosed above, the event sequences SQ and the timestamps sequences TTS could be anonymized without loss much information.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A data anonymity method, comprising:
   obtaining a data set comprising a plurality of direct-identifiers, a plurality of quasi-identifiers and a plurality of event logs each of which includes an activity and a timestamp;
   replacing a content of each of the direct-identifiers by a pseudonym;
   classifying, via a group-by algorithm with k-anonymity, the quasi-identifiers as a plurality of equivalence classes each of which has a quantity larger than k;
   linking the activities corresponding to each of the direct-identifiers according to the timestamps to obtain a plurality of event sequences;
   obtaining a similarity hierarchy tree according to a plurality of edit distances among the event sequences;
   grouping the event sequences according to the similarity hierarchy tree with k-anonymity to obtain at least one group whose size is larger than or equal to k; and
   generalizing the event sequences which are in the group.

2. The data anonymity method according to claim 1, wherein in the step of linking the activities to obtain the event sequences, the activities in each of the event sequences are sorted over time.

3. The data anonymity method according to claim 1, wherein in the step of obtaining the similarity hierarchy tree, all of the event sequences are classified as a plurality of first level clusters of the similarity hierarchy tree.

4. The data anonymity method according to claim 3, wherein in the step of obtaining the similarity hierarchy tree, each of the first level clusters has first center, and the first centers are classified as a plurality of second level clusters of the similarity hierarchy tree.

5. The data anonymity method according to claim 4, wherein in the step of obtaining the similarity hierarchy tree, each of the second level clusters has second center, and the second centers are classified as a plurality of third level clusters of the similarity hierarchy tree.

6. The data anonymity method according to claim 1, wherein in the step of grouping the event sequences, the event sequences corresponding an identical cluster in the similarity hierarchy tree are grouped.

7. The data anonymity method according to claim 1, wherein in the step of generalizing the event sequences in the group, each of the event sequences in the group is replaced by a generalization sequence.

8. The data anonymity method according to claim 7, wherein in the step of generalizing the event sequences in the group, one of the event sequences whose quantity is largest is selected to be the generalization sequence.

9. The data anonymity method according to claim 1, wherein in the step of generalizing the event sequences in the group, the event sequences in the group are replaced by n generalization sequences, if the size of the group is larger than (n−1)*k and less than or equal to n*k.

10. The data anonymity method according to claim 1, further comprising:
generalizing the timestamps;
linking the timestamps corresponding to each of the direct-identifiers to obtain a plurality of timestamps sequences; and
generalizing the timestamps sequences.

11. A data anonymity system, comprising:
an inputting unit for obtaining a data set comprising a plurality of direct-identifiers, a plurality of quasi-identifiers and a plurality of event logs each of which includes an activity and a timestamp;
a pseudonym unit for replacing a content of each of the direct-identifiers by a pseudonym;
a classifying unit for classifying, via a group-by algorithm with k-anonymity, the quasi-identifiers as a plurality of equivalence classes each of which has a quantity larger than k;
a linking unit for linking the activities corresponding to each of the direct-identifiers according to the timestamps to obtain a plurality of event sequences;
a tree creating unit for obtaining a similarity hierarchy tree according to a plurality of edit distances among the event sequences;
a grouping unit for grouping the event sequences according to the similarity hierarchy tree with k-anonymity to obtain at least one group whose size is larger than or equal to k; and
a generalizing unit for generalizing the event sequences which are in the group.

12. The data anonymity system according to claim 11, wherein the linking unit sorts the activities in each of the event sequences over time.

13. The data anonymity system according to claim 11, wherein the tree creating unit classifies the event sequences in the ground cluster as a plurality of first level clusters of the similarity hierarchy tree.

14. The data anonymity system according to claim 13, wherein in the similarity hierarchy tree, each of the first level clusters has first center, and the tree creating unit classifies the first centers as a plurality of second level clusters of the similarity hierarchy tree.

15. The data anonymity system according to claim 14, wherein in the similarity hierarchy tree, each of the second level clusters has second center, and the tree creating unit classifies the second centers as a plurality of third level clusters of the similarity hierarchy tree.

16. The data anonymity system according to claim 11, wherein the grouping unit groups the event sequences corresponding an identical cluster in the similarity hierarchy tree.

17. The data anonymity system according to claim 11, wherein the generalizing unit replaces each of the event sequences in the group by a generalization sequence.

18. The data anonymity system according to claim 17, wherein the generalizing unit selects one of the event sequences whose quantity is largest to be the generalization sequence.

19. The data anonymity system according to claim 11, wherein the generalizing unit replaces the event sequences in the group by n generalization sequences, if the size of the group is larger than (n−1)*k and less than or equal to n*k.

20. The data anonymity system according to claim 11, wherein the generalizing unit is further for generalizing the timestamps, the linking unit is further for linking the timestamps corresponding to each of the direct-identifiers to obtain a plurality of timestamps sequences, and the generalizing unit is further for generalizing the timestamps sequences.

* * * * *